Sept. 29, 1970   B. A. ROBINSON   3,531,676
ELECTROLUMINESCENT CELL FOR LARGE AREA ILLUMINATION
Filed April 2, 1968

INVENTOR
BESSIE A. ROBINSON
BY
ATTORNEY

United States Patent Office 3,531,676
Patented Sept. 29, 1970

3,531,676
ELECTROLUMINESCENT CELL FOR LARGE AREA ILLUMINATION
Bessie A. Robinson, East Aurora, N.Y., assignor to Astronics Luminescent, Inc., Gardenville Industrial Park, N.Y., a corporation of New York
Filed Apr. 2, 1968, Ser. No. 718,158
Int. Cl. H01j 1/62, 63/04
U.S. Cl. 313—108
11 Claims

ABSTRACT OF THE DISCLOSURE

The cell comprises a lower electrode and an upper electrode. The two electrodes are separated by a layer of dielectric material, and the upper electrode is an electrically conductive screen or grid which is coated with an electroluminous phosphor, such as zinc sulphide doped with copper and chlorine etc. When an AC voltage is applied across the two electrodes, the phosphor layer becomes luminescent. The cell may be made in large, flat sections from which portions of predetermined shape are punched; and one electrode may be movable relative to the other.

---

This invention relates to lamps, and more particularly to electroluminescent lamps, panels, and cells of the type utilizing a phosphorescent light source.

Presently there are two known types of electroluminous cells, panels, or lamps, namely, the sandwich cell, and the planar cell.

The sandwich type cell comprises a layer of electroluminescent phosphor positioned, or sandwiched, between two parallel conductive plates, one of which must be light transmissive (transparent or translucent) in order to permit the electroluminescent light to be seen. When an AC (alternating current) voltage is applied across the two conductive plates, light is generated across the sandwiched phosphor, and escapes or is transmitted through the light-transmissive conductive electrode.

The sandwich type cell is difficult or substantially impossible to manufacture in large area sizes (many square feet of surface area), because the thin layer of electroluminescent phosphor between the sheet type electrodes must be deposited uniformly in a constant thickness of approximately one to three mils (.001" to .003"). This thickness is difficult to hold constant over large areas. If the thickness of the electroluminescent phosphor layer varies, voltage breakdown will occur at the thinnest section thereof, thus preventing the device from producing the desired light output.

Another serious disadvantage of the sandwich type cell is that one of its electrode plates must be transparent, or translucent. This means that the ohmic resistance of such a thin sheet electrode will be very high, causing heating of the cell if a high voltage or high frequency AC current is employed to produce brilliant light. (Brightness increases with increasing excitation frequency, and also with increasing voltage.)

A further disadvantage of the sandwich type cell, at least as compared to applicant's invention is that for the same area, the capacitance is many times higher, therefore presenting a correspondingly heavier load to the AC power supply.

The planar type cell comprises a plurality of parallel conductors, or interdigital electrodes, which are mounted on a thin, plastic, dielectric substrate, with successive conductors or electrodes connected to opposite sides, respectively, of an AC power source, and with the spaces between adjacent electrodes filled with an electroluminous phosphor, so that when the conductors are energized, light is transmitted from the top face of the substrate, as well as the underside thereof if the substrate is transparent or translucent. One disadvantage of this construction although it is very simple and of low capcitance, is that it is very difficult to obtain high production yields, because the interdigital grid lines themselves must be extremely narrow (for example .004"), and closely spaced (for example .004"). These fine line conductors and the close spaces therebetween are necessary if the cell is to glow brightly. However the proximity of the several conductors leads to the problem of shorting against one another. For example, in etching or electroplating the fine conductive grid lines, the portions of the conductive material between the grid lines are not always removed, or fully etched out, thus causing undesirable shorting out of adjacent conductors or interdigital grids. When electroplating this grid structure, the metal will be electroplated between the lines, thus also causing shorted grids or conductors. Moreover, in such fine structures even dust particles, dirt or damaged photo-negatives used in the photomechanical processing of the grid pattern may also lead to shorting out of one grid or conductor upon the other.

Primary objects of this invention are to simplify the construction, accelerate the assembly, increase the yield, and thereby decrease the cost of production of electroluminescent cells.

Another object of this invention is to permit electroluminescent cells of large area to be made economically, as compared to prior, like cells, for application to lighting interior walls, and ceiling panels.

Another object of the invention is to provide an electroluminescent panel which can be made thin enough to be punched and to be cut with shears, and which is flexible.

A more specific object of this invention is to provide an improved cell of the type described, which can be made in large, flat sections from which portions can be readily stamped or punched in any desired shape or form.

Still another object of this invention is to provide an improved electroluminescent cell of the type described, in which one electrode or conductor is movable relative to the other for regulating the length or area of light produced by the intervening layer of phosphor material.

A still further object of the invention is to provide an electroluminescent indicator or bar graph where one electrode is permitted to move or rotate in a plane parallel with respect to the other electrode, thereby to regulate the length or area of light produced in general correspondence to the force causing the motion of the electrode.

Other objects of the invention will be apparent hereinafter from the specification and from the recital of the appended claims, particularly when read in conjunction with the accompanying drawing.

In the drawing, wherein the thicknesses of the cell elements are exaggerated for clarity of illustration:

Figure 1:
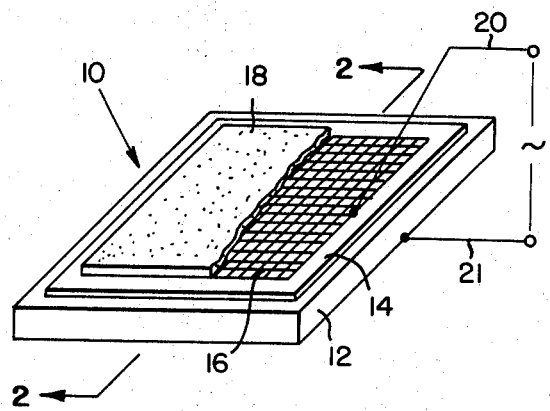
FIG. 1 is a perspective view of an electroluminous cell, or lamp, made in accordance with one embodiment of this invention.

Referring now to the drawing by numerals of reference, and first to the embodiment illustrated in FIG. 1, 10 denotes an electroluminescent cell or lamp, which comprises a lower, electrically conductive electrode or substrate 12, a thin insulating layer 14, an upper electrode in the form of a conducting open mesh or screen 16, and a layer 18 of electroluminescent phosphor applied over the upper electrode mesh. Mesh or screen 16 permits electric field fringe lines to form between it and lower electrode 12. When an alternating current is applied to the two electrodes 20 and 21, which are connected to the two electrodes 12 and 16, respectively, the electroluminescent phosphor will be excited to luminescence due to the traversing electric fringe lines produced between the conductive substrate 12 and the conductive upper mesh electrode 16.

The insulating layer 14 is applied to the conducting substrate 12 first. Then the conductive mesh or screen 16 is applied. The final step is the application of an electroluminescent phosphor formulation. This formulation may be applied by spraying silk screening, or any other suitable method.

The lower electrode 12 may be made from a conductive plastic, graphite, a metal plate or foil, conductive paint, etc. For special applications, a liquid metal, such as mercury, or a gallium eutectic, or a conducting electrolyte could be employed.

The insulating layer 14 may be made of one of the various plastic insulating films, glass, mica, a thin ceramic sheet, a cured plastic resin, wax film on paper, etc.

The upper open mesh grid or screen 16 can be formed from fine, conductive wire screening, electroformed or etched metal mesh or printed conductive grating via the silk screen or printing press method. The exact configuration or geometrical design of the grid 16 is a matter of choice so long as provision is made for electric field fringe lines to terminate on the sides and top of the mesh or screen openings. This condition is automatically satisfied by using an open mesh or screen, or the like.

The electroluminous phosphor used can be zinc sulphide doped with various activators such as copper, chlorine, manganese, silver, etc. These phosphors are well known, and several are commercially available. Normally the electroluminescent phosphor is mixed in a dielectric binder of insulating resin, laquer or glass frit, and is then sprayed or applied by a silk screen technique to the grid 16.

Figure 2:
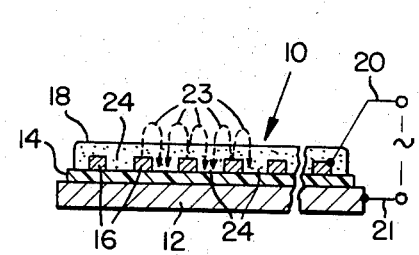
FIG. 2 is an enlarged, fragmentary sectional view of this cell taken along line 2—2 in FIG. 1 looking in the direction of the arrows.

The two wire leads 20 and 21 are connected across an alternating current (AC) power supply to set up a voltage potential between the upper and lower electrodes 16 and 12, respectively. The wires 20 and 21 may, of course, be permanentaly attached to the cell 10, and be provided with a conventional plug (not illustrated) for insertion into an AC wall receptacle, or the like. When the AC voltage is supplied to the electrodes, the phosphor layer 18, as previously stated, is excited and becomes luminescent due to the traversing of the electric field fringe lines of flux 23 (broken lines in FIG. 2) between the upper and lower electrodes around and through the openings 24 in the upper electrode or grid 16. The glowing layer 18 of phosphor material thus transmits light upwardly from cell 10 in proportion to the gauge of the grid 16, and to the voltage drop between the grid and the lower electrode 12. For example, the more holes 24 there are per square foot in the grid 16, the greater will be the area of the layer 18 that becomes luminescent when the cell is energized, because the phosphor material in the vicinity of the sides and top of each hole 24 will generate light in proportion to the number of lines of flux traversing the hole. For this reason also, the thinner the layer of insulating material 14, the brighter will be the light emitted by the layer 18 for a given voltage drop between the upper and lower electrodes 12 and 16. However, the layer 14 must not be so thin that it will break down under the voltage differential applied between the electrodes 12 and 16, thus causing undesirable shorting of one on the other. The thickness of layer 14, therefore, is ultimately determined by the operating voltage of the cell—i.e., the potential between electrodes 12 and 16 under normal operating conditions. For example, for an exceptionally brilliant lamp or cell 10, a high voltage would be required, and hence the layer 14 would have to be rather thick.

Figure 3:
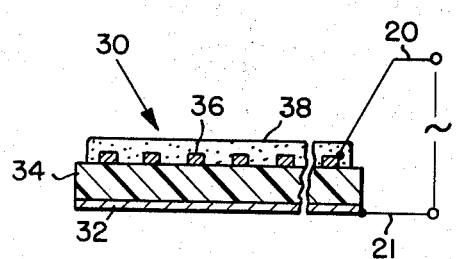
FIG. 3 is a fragmentary sectional view similar to FIG. 2, but illustrating a modified form of cell.

In the embodiment of the invention shown in FIG. 3 the insulating layer 34 performs the role of the supporting substrate. This layer is substantially thicker than the insulation layer 14 in the first embodiment. The lower electrode 32 in this case is merely a thin, electrically conductive coating applied to the underside of the insulation 34. The grid 36 and coating 38 may be similar to the grid 16 and coating 18, respectively, of the embodiment shown in FIGS. 1 and 2. Excitation terminals 20, 21 are connected to the thin conductive lower electrode 32 and to the upper mesh electrode 36, respectively.

If it is desired to have light observed from both sides of cell 30, the lower electrode 32 may be made in the form of a grid or screen similar to the upper grid 36; and the light may then escape through the mesh openings in the lower grid as well as from the upper grid 36. It may also be desirable to apply phosphor to both sides of cell 30—e.g., a green emitting phosphor on grid 36, and a blue emitting phosphor on the lower meshed grid 32.

Figure 4:
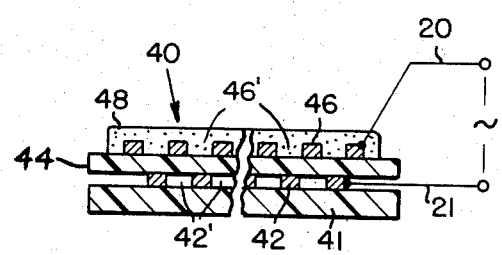
FIG. 4 is a fragmentary sectional view similar to FIGS. 2 and 3, but illustrating still another type of cell made in accordance with this invention.

FIG. 4 illustrates another embodiment 40 of the invention having a transparent, dielectric substrate 41 of glass, plastic, mica, or the like, a lower electrode 42 in the form of a conductive screen or grid, a thin insulating layer 44 applied over the upper face of electrode 42, an upper electrode or grid 46, similar to lower electrode 42, and a layer of electroluminous phosphor 48, which is applied over the upper electrode or grid 46. It will be noted that the grids 42 and 46 are slightly offset or misaligned relative to one another, so that their openings 42' and 46', respectively, will not register. This misalignment improves the shape of the electric field fringe pattern developed between electrodes 42 and 46, when an AC voltage is applied thereacross by the leads 20 and 21. However, this misalignment is not critical. The openings 42' 46' in the grids 42, 46 and the transparent insulator 41 permit light to be transmitted from both sides of the cell 40.

Figure 5:
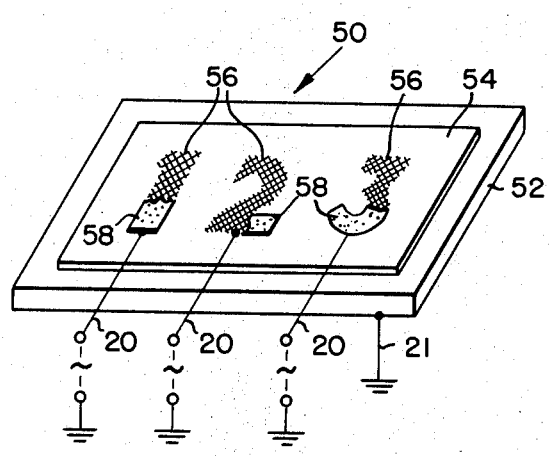
FIG. 5 is a perspective view of a cell made in accordance with yet another embodiment of this invention.

FIG. 5 shows still another embodiment of the invention. Here, the cell 50 comprises a flat, electrically conductive substrate 52, covered by a layer of insulation 54; but the upper electrode is divided into three separate grids 56 selectively spaced from each other so as to generate a discrete pattern or figure of electroluminescent light such as may be used for a sign, an indicator, etc. These grids are coated, as in the previous embodiments, with a layer of electroluminous phosphor 58. The coated grids 56, here shown, have the configurations of numerals 1, 2 and 3, respectively; and each is connected by an individual lead or wire 20 to one side of AC power source, the substrate 52 being connected to this same power source by a lead 21. When voltage is applied to the leads, the several numerals defined by the grids 56 are illuminated to form discrete patterns of light.

Figure 6:
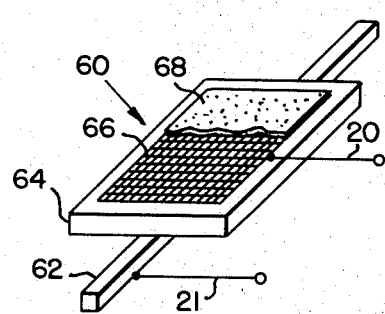
FIG. 6 is a fragmentary perspective view of an adjustable electroluminous cell made in accordance with this invention.

FIG. 6 illustrates still another modification of the invention. Here the cell 60 comprises a screen or grid-type upper electrode 66, which is coated with an electroluminescent phosphor material 68, and is secured to the upper face of a dielectric insulator 64. Mounted to move over the underside of the insulator 64 is the lower electrode 62, which in the embodiment illustrated is an electrically conductive bar which may be reciprocated by a fluid-pressure operated piston, a rack and pinion, or the like. Grid 66 and bar 62 are connected in any conventional manner, as by leads 20 and 21 across an AC voltage source. This causes the portion of the layer 68, which is immediately above bar 62, to become illuminated, thus forming on the upper face of the cell 60 an illuminated band or line of light, which is movable in response to movement of bar electrode 62.

It will be understood, moreover, that different means may be employed for producing relative motion between the upper and lower electrodes of a cell made in accordance with this invention. For example, instead of being mounted for linear reciprocable motion, one electrode can be rotatable, for example, about a vertical axis normal to the cell in a manner similar to the movement of the second hand of a clock, or the pointer on a gauge or dial. In many instances it may be desired to use a cell of the type above-described to provide, for instance, an illuminated dial face, or the like.

Figure 7:
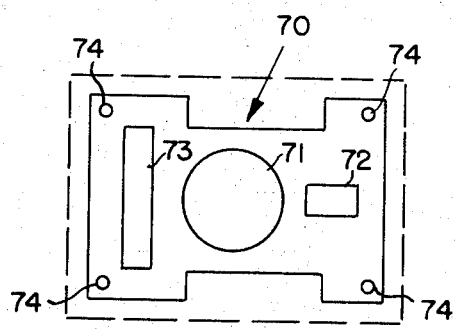
FIG. 7 is a plan view showing how an electroluminous dial face or instrument panel may be stamped or punched from a blank in accordance with this invention.

In many applications it is desirable to punch mounting holes, and to shear and blank the shape of an electroluminescent cell, as indicated, for instance, in FIG. 7 to achieve a desired result. Here the substrate as well as insulating layer and screen electrode are punched and blanked to provide holes and slots 71, 72 and 73 for registry with dials, gauges, or the like, and to have openings 74 for mounting screws, or the like. This may be done without impairing the ability of the resultant cell 70 to thereafter emit light, when its upper and lower electrodes are connected across a proper AC voltage source, and at least one electrode is covered with an electroluminescent material.

From the foregoing it will be apparent that applicant has developed a relatively simple, sturdy and reliable electroluminescent cell, which is considerably more versatile than prior such cells. Applicant's cell does not require a highly resistive, transparent electrode nor the precise tolerances in thickness of the phosphor layer as does the sandwich type cell. Moreover, applicant does not require a perfectly non-shorting grid structure as does the prior, planar-type cells. Applicant's improved electroluminescent construction employs an open mesh as one or both electrodes; and the electrodes are prevented from short-circuiting by an insulating layer.

With applicant's construction, the finer the grid or screen mesh openings, the more, and the more even, the light that is generated. In other words, the more holes in the screen electrode the more area of light that is generated, since the electroluminescent phosphor in the vicinity of the sides of each hole generate light from the traversing field lines. Furthermore, the thinner the insulating member between the upper and lower electrodes, the brighter will be the electroluminescent light for a given voltage. The insulating layer may be less than 1 mil (.001"). However, the thickness of the insulating material between the upper and lower electrodes is determined by the operating voltage of the cell. For example for high brightness lamps, a high voltage is required; and for such lamps, therefore, an insulating layer thick enough to preclude voltage breakdown must be provided.

A protective film of plastic tape or the like can be applied over the electroluminscent cell to protect the user from electric shocks as well as to prevent damage to the phosphor layer. Of course, rigid cells can be provided where the supporting structure or substrate is of any standard stock size in plastic, glass, metal, or ceramic.

While the invention has been described in connection with several specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. An electroluminescent cell, comprising
    a pair of electrodes,
    a layer of dielectric insulation interposed between and separating said electrodes to prevent the conduction of electricity therebetween,
    an electroluminescent material covering one of said electrodes, and
    means for applying an alternating current potential across said electrodes,
    said one electrode being an electrically conductive mesh having therethrough a plurality of spaced openings whereby when said potential is applied across said electrodes the electroluminescent material on the surface of said mesh and around the marginal edges of said openings is caused to glow.

2. A cell as defined in claim 1 wherein the other elcetrode is also a mesh.

3. A cell as defined in claim 1 wherein the other electrode is thicker than said layer of insulation and forms a rigid substrate for supporting said cell.

4. A cell as defined in claim 1, wherein said layer of insulation is thicker than the other electrode and forms a rigid support for said cell.

5. An electroluminescent cell as defined in claim 4, wherein said other electrode is a thin film of electroconductive material affixed to said layer of insulation at the opposite side thereof from said one electrode.

6. A cell as defined in claim 1, wherein
    the other electrode is also a mesh, and
    a rigid, light transmissive substrate is secured over said other electrode on the side thereof remote from said layer of insulation.

7. An electroluminescent cell as defined in claim 1, wherein said one electrode comprises one of a plurality of spaced, discrete, electroconductive meshes disposed on the same side of said layer of insulation and covered with said electroluminescent material.

8. An electroluminescent cell as defined in claim 1, wherein one of said pair of electrodes is movable relative to the other of said pair.

9. An electroluminescent cell as defined in claim 1, wherein
    the other electrode is also a mesh, and
    said electroluminescent material is applied to both said electrodes.

10. An electroluminescent cell as defined in claim 9, wherein different electroluminescent material is applied to each of said electrodes, so that the color of the light emitted by said one electrode differs from that emitted from said other electrode.

11. An electroluminescent cell as defined in claim 1, wherein
    said electrodes are disposed in spaced, parallel planes, and said layer of insulation is disposed in a third plane located between the planes of said electrodes.

References Cited

UNITED STATES PATENTS

| | | | |
|---|---|---|---|
| 2,774,004 | 12/1956 | Jaffe | 313—108 |
| 2,905,849 | 9/1959 | Kazan | 313—92 |
| 2,909,599 | 10/1959 | Berkley | 313—108 X |
| 2,928,015 | 3/1960 | Bartels | 313—108 |
| 3,042,834 | 7/1962 | Nicoll | 315—169 |
| 3,110,836 | 11/1963 | Blazek et al. | 313—108 |
| 3,309,712 | 3/1967 | Cole | 313—108 X |
| 3,366,836 | 1/1968 | Harvey | 315—169 |

FOREIGN PATENTS 539,847 4/1957 Canada.

JAMES W. LAWRENCE, Primary Examiner

D. O'REILLY, Assistant Examiner

U.S. Cl. X.R.

313—109.5; 315—169